US009162561B2

(12) United States Patent
Marois et al.

(10) Patent No.: US 9,162,561 B2
(45) Date of Patent: Oct. 20, 2015

(54) AIR VENTILATION SYSTEMS FOR VEHICLES

(75) Inventors: Dany Marois, Sherbrooke (CA); David Laroche, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 14/397,666

(22) PCT Filed: Apr. 30, 2012

(86) PCT No.: PCT/US2012/035830
§ 371 (c)(1),
(2), (4) Date: Oct. 29, 2014

(87) PCT Pub. No.: WO2013/165359
PCT Pub. Date: Nov. 7, 2013

(65) Prior Publication Data
US 2015/0122567 A1    May 7, 2015

(51) Int. Cl.
| | |
|---|---|
| *B62D 61/06* | (2006.01) |
| *B60K 11/06* | (2006.01) |
| *B62K 5/027* | (2013.01) |
| *B62K 5/05* | (2013.01) |
| *B62K 5/08* | (2006.01) |
| *B60K 11/04* | (2006.01) |
| *B62D 25/08* | (2006.01) |

(52) U.S. Cl.
CPC ................ *B60K 11/06* (2013.01); *B60K 11/04* (2013.01); *B62D 25/081* (2013.01); *B62D 61/065* (2013.01); *B62K 5/027* (2013.01); *B62K 5/05* (2013.01); *B62K 5/08* (2013.01)

(58) Field of Classification Search
CPC .................................. B62K 5/027; B62K 5/05
USPC ........................................ 180/210, 68.1–68.5
See application file for complete search history.

(56) References Cited

U.S. PATENT DOCUMENTS

| | | | | |
|---|---|---|---|---|
| 5,012,883 | A  * | 5/1991 | Hiramatsu ..................... | 180/225 |
| 7,314,107 | B2 * | 1/2008 | Nakagome et al. .......... | 180/68.3 |
| 2005/0039967 | A1 | 2/2005 | Aube et al. | |
| 2005/0217909 | A1* | 10/2005 | Guay et al. ................... | 180/68.4 |
| 2006/0006016 | A1* | 1/2006 | Nishizawa .................... | 180/219 |
| 2009/0321169 | A1 | 12/2009 | Bedard et al. | |
| 2010/0108010 | A1 | 5/2010 | Matsuda et al. | |
| 2010/0263956 | A1* | 10/2010 | Bedard et al. ................. | 180/210 |

OTHER PUBLICATIONS

International Search Report of International Application PCT/US2012/035830; Aug. 10, 2012; Lee W. Young.

* cited by examiner

*Primary Examiner* — John Walters
*Assistant Examiner* — James Triggs
(74) *Attorney, Agent, or Firm* — BCF LLP (57) ABSTRACT

A straddle-seat vehicle has a frame, and connected thereto, a pair of front wheels, at least one rear wheel, a pair of footrests, an engine, a radiator connected to the engine for cooling the engine, and a cowling. The cowling encloses at least a portion of the radiator and includes an inlet in fluid communication with the portion of the radiator, a lateral outlet on a first side, and a downward outlet on a lower surface, both outlets rearward of the inlet. The inlet is adapted to direct air to enter through the portion of the radiator into the cowling. A cowling wall disposed between the inlet and one of the pair of footrests deflects air away from the pair of footrests. The lateral and downward outlets, each in fluid communication with the inlet, are adapted to direct air exiting the cowling away from the pair of footrests.

16 Claims, 11 Drawing Sheets

AIR VENTILATION SYSTEMS FOR VEHICLES

FIELD OF THE INVENTION

The present invention relates to air ventilation systems for vehicles.

BACKGROUND

Many kinds of straddle-seat vehicles, designed for road-use and/or off-road trail use, are commonly used for recreational purposes. The engine of these vehicles typically generate a lot of heat during operation. A radiator assembly, including either a single radiator or a pair of radiators, is sometimes provided for cooling the engine. The radiators are generally disposed in the front of the vehicle, so that they can be cooled by the oncoming air as the vehicle is being driven. The radiators are typically configured to permit the oncoming air to pass through the radiator and flow rearward along either side of the vehicle, sometimes making contact with the riders. As this air has been heated by the radiators, it would be desirable to direct the air away from any part of the riders' bodies.

There is thus a need for a ventilation system for straddle seat vehicles that allows for efficient cooling of the engine and other internal components of the vehicle while limiting discomfort of the riders caused by the associated air flows.

SUMMARY

It is an object of the present invention to ameliorate at least some of the inconveniences present in the prior art.

In one aspect, the present provides a vehicle, including a frame having a front portion and a rear portion, a pair of front wheels, including a left front wheel and a right front wheel, each rotatably connected to the front portion of the frame, and at least one rear wheel rotatably connected to the rear portion of the frame. The vehicle also includes a straddle seat connected to the frame and disposed rearward of the pair of front wheels. A pair of footrests including a left footrest and a right footrest are disposed respectively on a left side and a right side of the seat, the pair of footrests being connected to the frame and being disposed vertically lower than the seat. An engine is connected to the frame and adapted to propel the vehicle. A radiator is connected to the frame and to the engine for cooling the engine; and a cowling is connected to the frame and enclosing at least a portion of the radiator. The cowling includes an inlet in fluid communication with at least the portion of the radiator. The inlet is adapted to direct air to enter through the portion of the radiator into the cowling. A cowling wall is disposed between the inlet and one of the pair of footrests. The cowling wall deflects air entering through the radiator away from the one of the pair of footrests. A lateral outlet, in fluid communication with the inlet, is defined on a first side of the cowling rearward of the inlet. A downward outlet in fluid communication with the inlet is defined on a lower surface of the cowling rearward of the inlet. The lateral outlet and the downward outlet, are each adapted to direct air exiting the cowling away from the one of the pair of footrests.

In a further aspect, the lateral outlet is adapted to direct a portion of the air exiting the cowling in a laterally outward direction.

In yet another aspect, the downward outlet is adapted to direct a portion of the air exiting the cowling in a downward direction.

In an additional aspect, the cowling further includes at least one lateral passage fluidly communicating the inlet with the lateral outlet.

In an additional aspect, the cowling further includes at least one downward passage fluidly communicating the inlet with the downward outlet.

In another aspect, the cowling encloses the radiator.

In another aspect, the vehicle further includes at least one fan adapted to draw air into the cowling through the inlet and through the radiator.

In a further aspect, the at least one fan is disposed rearward of the radiator.

In an additional aspect, the inlet is disposed laterally between a longitudinal centerline of the frame and one of the pair of front wheels.

In an additional aspect, the inlet is disposed rearward of the pair of front wheels.

In an additional aspect, the inlet is generally oriented forwardly.

In yet another aspect, the one of the pair of footrests is disposed rearward of the lateral and downward outlets.

In an additional aspect, the one of the pair of footrests is disposed vertically above the downward outlet.

In another aspect, the pair of footrests is a pair of footpegs.

In yet another aspect, the pair of footrests is a pair of footboards.

In another aspect, the cowling is a left cowling, the radiator is a left radiator, the inlet is a left inlet, the one of the pair of footrests is a left footrest, the first side of the cowling is a left side of the cowling, the lateral outlet is a left lateral outlet, the downward outlet is a left downward outlet. The vehicle further includes a right radiator connected to the frame and to the engine for cooling the engine; and a right cowling connected to the frame and enclosing at least a portion of the right radiator. The right cowling includes a right inlet fluidly communicating at least the portion of the right radiator. The right inlet is adapted to direct air to enter through the portion of the right radiator into the right cowling. A right cowling wall disposed forward of the right footrest, deflects air entering through the portion of the right radiator into the right cowling away from the right footrest. A right lateral outlet, in fluid communication with the right inlet, is defined on a right side of the cowling rearward of the right inlet. A right downward outlet, in fluid communication with the right inlet, is defined on a lower surface of the right cowling rearward of the right inlet. The right lateral outlet and the right downward outlets are each adapted to direct air exiting the cowling away from the right footrest.

For purposes of the present application, terms related to spatial orientation when referring to a vehicle and components in relation to the vehicle, such as "forwardly", "rearwardly", "left", "right", "above" and "below", are as they would be understood by a driver of the vehicle, with the vehicle in a straight ahead orientation (i.e. not steered left or right), and in an upright position (i.e. not tilted). The explanations provided above regarding the above terms take precedence over explanations of these terms that may be found in any one of the documents incorporated herein by reference.

Embodiments of the present invention each have at least one of the above-mentioned object and/or aspects, but do not necessarily have all of them. It should be understood that some aspects of the present invention that have resulted from attempting to attain the above-mentioned object may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION

With reference to FIGS. 1A-1D, a vehicle 1 has a straddle seat 11 that accommodates two riders, a driver and a passenger. While the vehicle 1 shown is designed to accommodate two adult-sized riders, it is contemplated that the vehicle 1 may be adapted to accommodate a single rider or more than two riders.

Figure 1A:
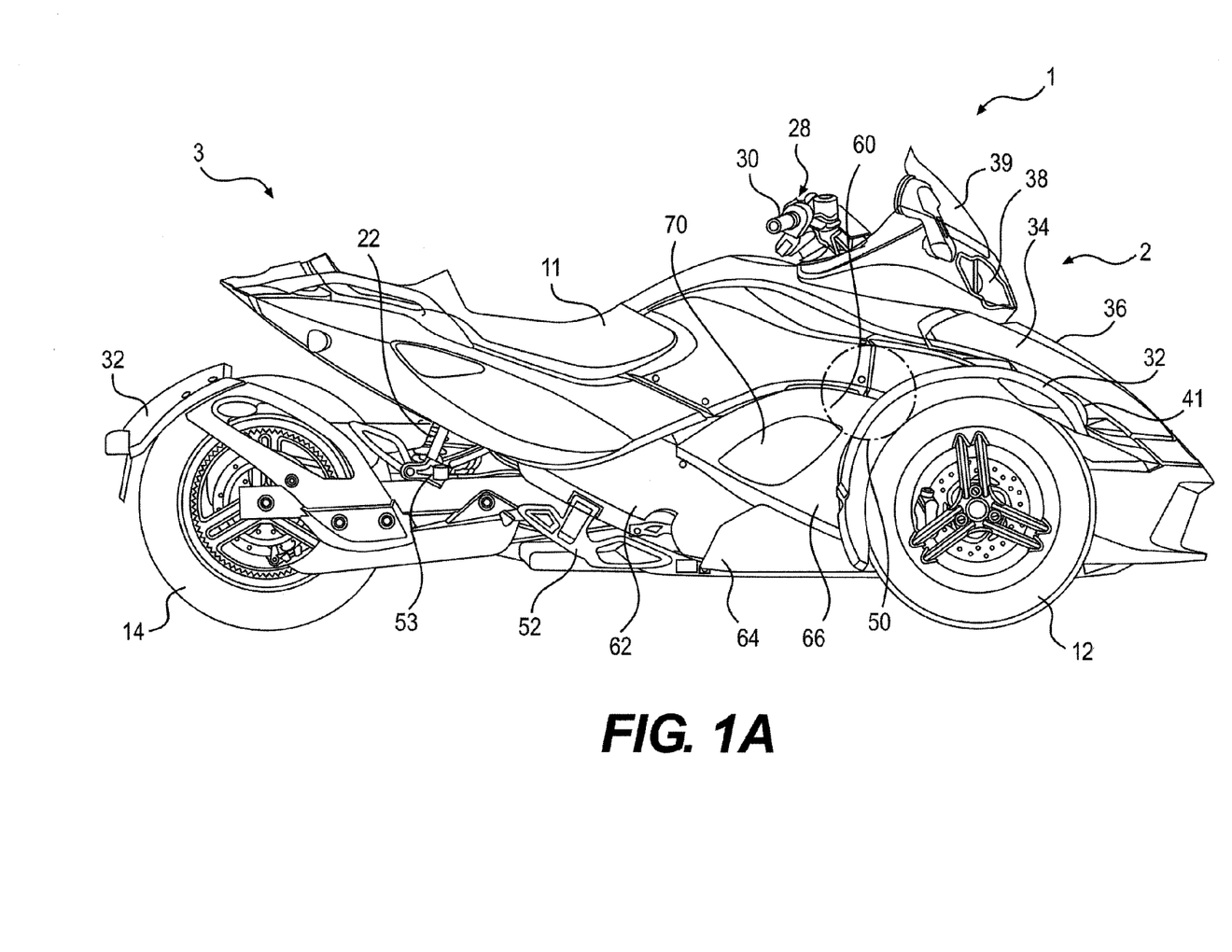
FIG. 1A is a right side elevation view of an embodiment of a straddle-seat vehicle.
Figure 1B:
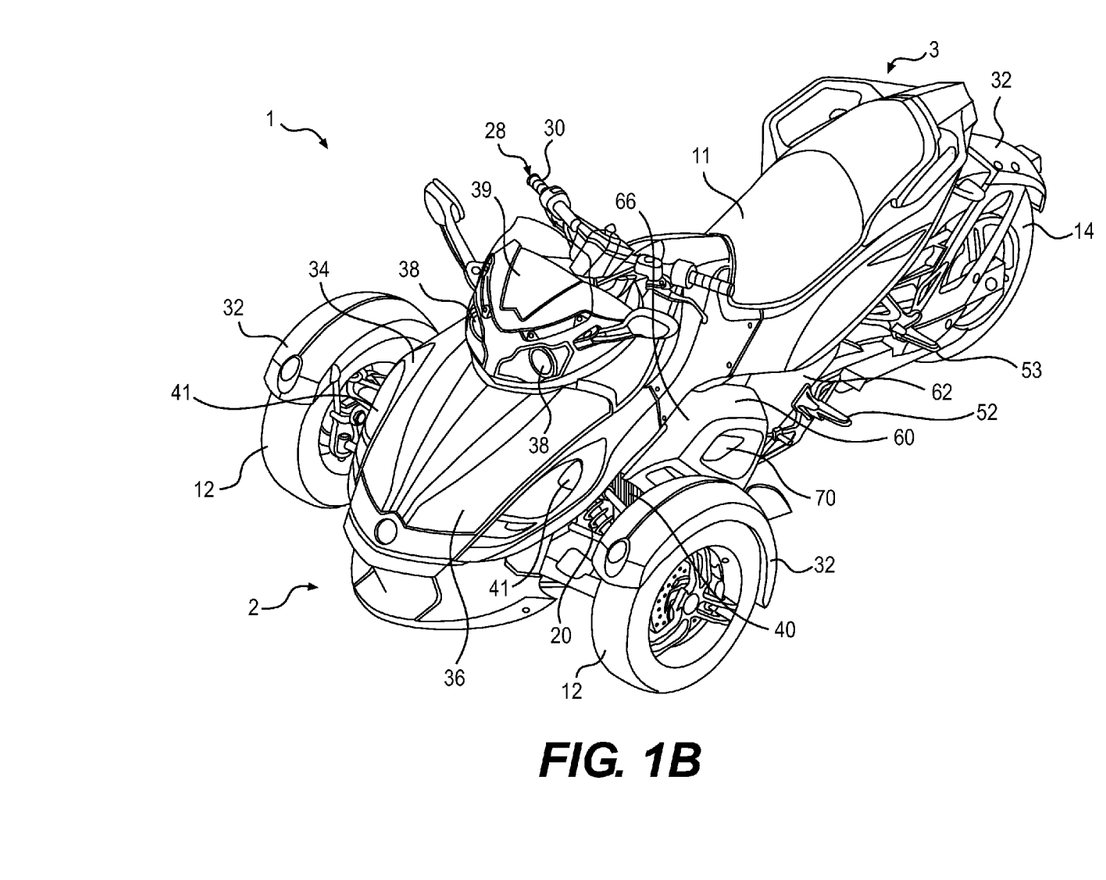
FIG. 1B is a perspective view taken from a front, left side of the vehicle of FIG. 1A.
Figure 1C:
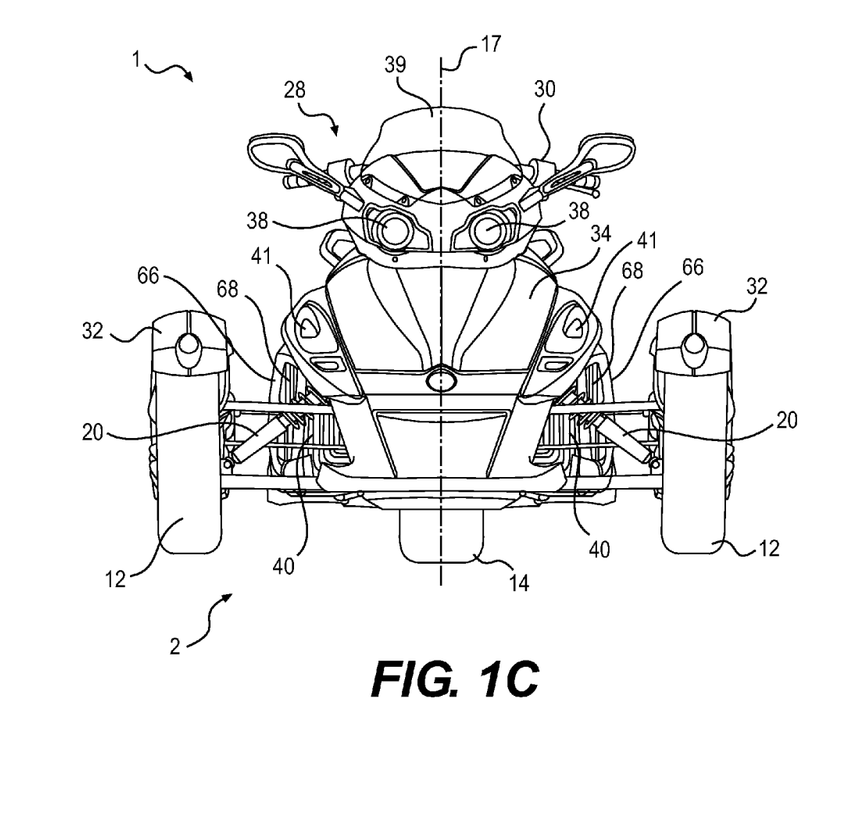
FIG. 1C is a front elevation view of the vehicle of FIG. 1A.
Figure 1D:
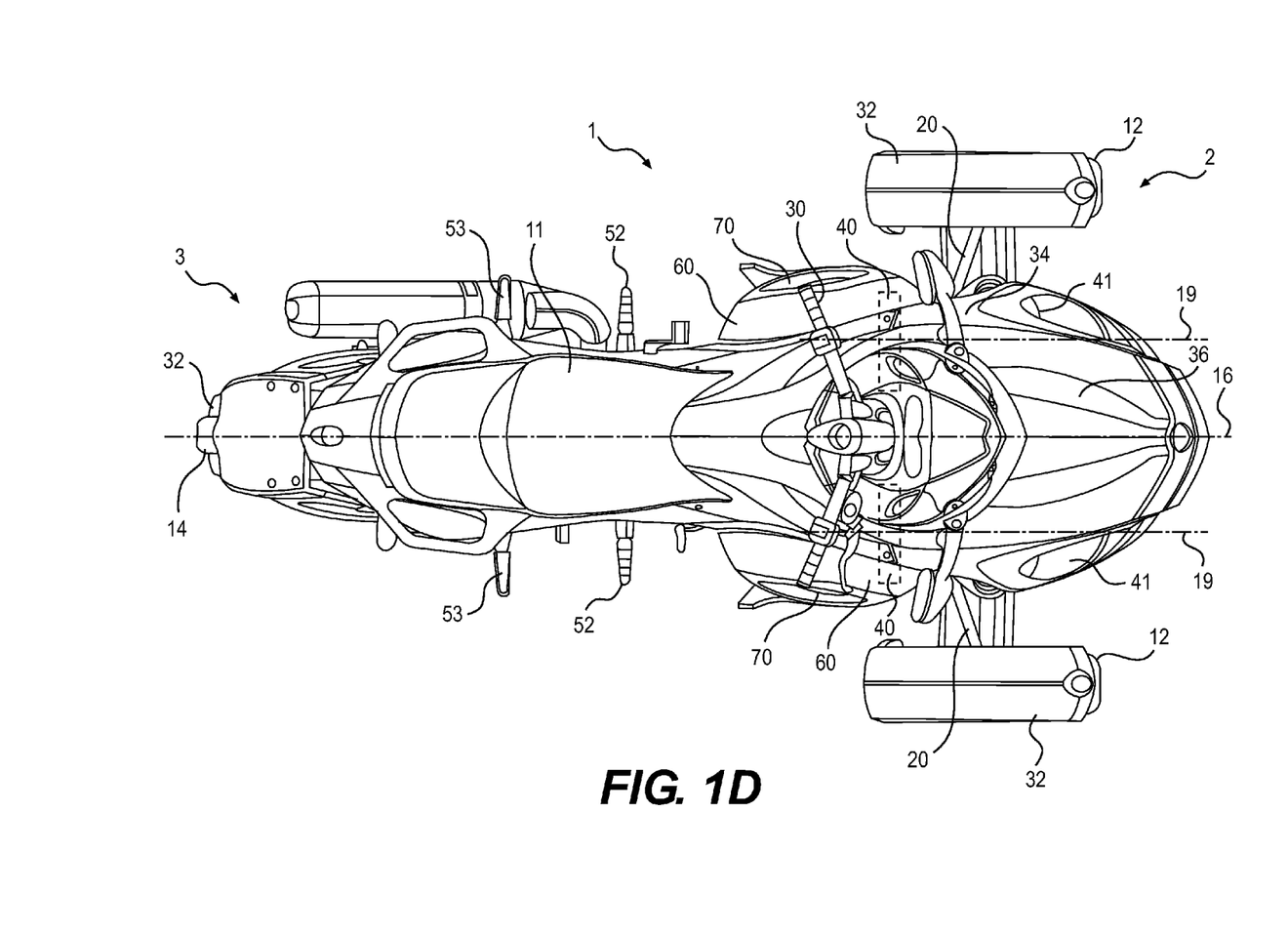
FIG. 1D is a top plan view the vehicle of FIG. 1A.

The vehicle 1 has a front portion 2, a rear portion 3, and a longitudinal centerline 16 (FIG. 1D). A pair of front wheels 12 including left and right front wheels 12, are disposed in the front portion 2 of the vehicle 1. A single rear wheel 14 is disposed in the rear portion 3 of the vehicle 1, however, it is contemplated that the vehicle 1 could have more than one rear wheel 14. The front wheels 12 are offset from the longitudinal centerline 16 by equal distances in the lateral direction, and the rear wheel 14 is centered with the longitudinal centerline 16.

The vehicle 1 includes a frame 6 (FIG. 2) forming the support structure to which the seat 11 and the wheels 12 and 14 are connected. The frame 6 is a tubular frame, however, it is contemplated that the vehicle 1 could have any frame structure that can support at least one rider and have attached thereto at least a pair of front wheels 12 and at least one rear wheel 14.

The front wheels 12 are each rotatably attached to the frame 6 and supported thereon by a front suspension assembly 20 secured to the frame 6. The rear wheel 13 is rotatably attached to the rear portion of the frame 6 and supported thereon by a rear suspension assembly 22 secured to the frame 6. The front wheels 12 are attached to the frame so as to be able to turn with respect to the longitudinal centerline 16 of the vehicle 1. A steering assembly 28, including a handlebar 30 and steering linkages (not shown), are connected to the front wheels 12 for controlling steering of the front wheels 12.

A fender 32 is associated with each of the front wheels 12. Each fender 32 covers the top and rear portions of the tires. The fender 32 prevents dirt, water and road debris from being kicked up onto the rider, while the rider operates the vehicle 1. Each fender 32 of the front wheels 12 is linked to the front suspension assembly 20 and the steering assembly 28 such that the fender assembly 32 moves with the front wheels 12 during steering of the vehicle 1 thereby ensuring that the tires do not kick up dirt, water and road debris as the vehicle 1 turns.

The front of the vehicle 1 includes a fairing 34 which forms an external protective cover for the engine 50 and also provides an external decorative shell for the vehicle 1. The fairing 34 includes a hood 36 hingedly connected at its lower portion that permits access to an interior storage compartment (not shown) in the front portion 2 of the vehicle 1. The interior storage compartment provides space for storing personal belongings. The hood 36 can be provided with a lock assembly (not shown) to limit access to the storage compartment and to prevent removal of items stored therein when the rider is not present. The upper portion of the fairing 34 also includes a pair of headlights 38 and a windshield 39 in the front section. The lower portion of the fairing 34 includes another pair of headlights 41.

The engine 50 is operatively connected to the rear wheel 14 to drive the rear wheel 14 and is secured directly to the frame 6. It is contemplated that the engine 50 may be secured to the frame 6 using any suitable mounting assembly. The engine 50 is supported behind the front suspension assembly 20 above the bottom of the frame 6. The engine 50 is a 4-stroke internal combustion engine, specifically, a 951 cc four-stroke V-twin (V2) engine manufactured by ROTAX®. The vehicle 1, however, is not limited to this type of engine. It is contemplated that other engine displacement sizes could be used. Furthermore, a two-stroke engine and an electric motor could also be employed instead of a 4-stroke engine. The term "engine", as used herein, refers generally to any type of engine and motor, that is generally configured to propel the vehicle 1 on ground.

Figure 2:
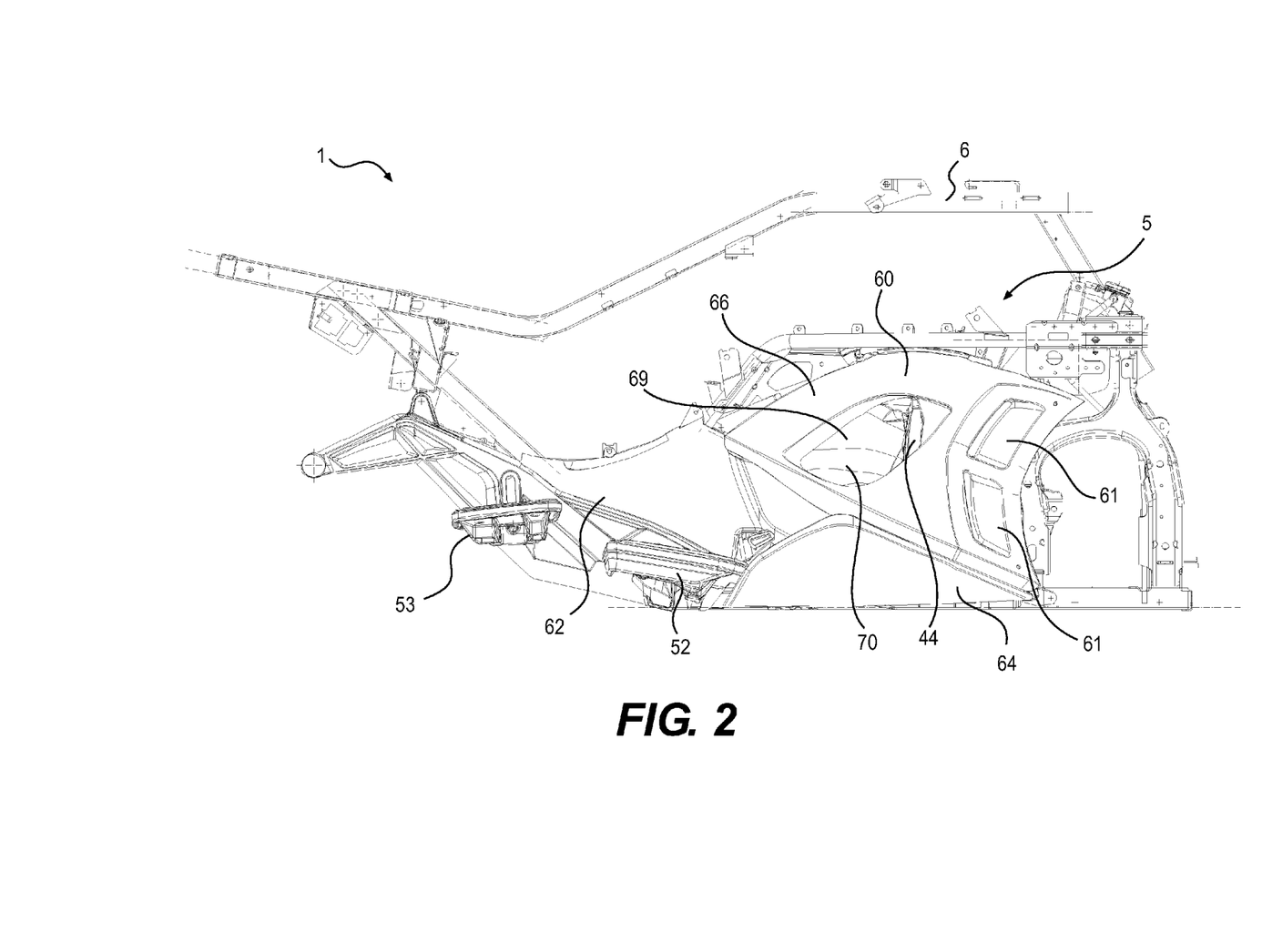
FIG. 2 is a right side elevation view of another embodiment of a vehicle showing a portion of a frame and a right footrest of a pair of footrests, and the right side panels of a cowling.

In addition to the fairing 34 in the front, the vehicle 1 includes other panels attached to the frame 6 for protecting the engine 50 and other parts of the vehicle 1. On the right side of the vehicle 1, lateral panels 60, 62, 64 removably attached to the frame 6, form a right cowling 66 enclosing a space 69 (FIG. 2). Similarly, on the left side of the vehicle (FIG. 1B), lateral panels 60, 62, 64 (not shown) removably attached to the frame 6 on the left side of the vehicle 1 form a left cowling 66 enclosing a space 69 (not shown). In general, a plurality of cowlings, either fully or partially enclosing a space within may be provided in different parts of the vehicle 1, adapted for different vehicle components. The cowlings could be defined by a single continuous panel or a plurality of panels enclosing, either partially or fully, a space within. The panels 60, 62 and 64 forming the cowling 66 are removably connected to each other, and to the frame 6, however, it is also contemplated that the panels may be permanently attached to each other and/or the frame 6. The panels are constructed of molded plastic and/or composite materials, however, it is contemplated that any suitable materials may be used.

A pair of footrests 52, including a left footrest and a right footrest, respectively disposed on a left side and a right side of the longitudinal centerline 16, are connected to the frame. The footrests 52 are disposed vertically below the seat 11 and designed to support the drivers feet on either side. A second pair of left and right footrests 53, disposed longitudinally rearward of the driver footrests 52, are provided to support the feet of a passenger seated behind the driver. The driver footrests 52 and the passenger footrests 53 are footpegs (52, 53 FIG. 1A-1D) comprising a laterally extending rod designed to support the middle of a foot. FIGS. 2 to 8 show another embodiment of a vehicle 1, in which the footrests 52, 53 are footboards (52, FIGS. 2 and 4) designed to support the entire foot. It is contemplated that more or less than two pairs of footrests 52, 53 may be provided depending on the number of riders that the vehicle 1 is designed for. In some embodiments, the driver footrests 52 and passenger footrests 53 may be combined as a single footrest on each side of the vehicle 1.

Alternative embodiments of straddle seat vehicles of the type with a split radiator construction are described in more detail in U.S. Pat. No. 7,464,781, issued Dec. 16, 2008, the entirety of which is incorporated herein.

With reference to FIG. 1C, a radiator assembly, including a pair of spaced left and right radiators 40 is provided for cooling the engine 50. The left and right radiators 40, are supported on the left and right sides of the frame assembly 6, and are in fluid connection with the engine 50 to cool the engine 50. Although, in the embodiment shown, the radiators 40 are connected in parallel to the engine 50, it is contemplated that the radiators 40 may be connected in series with each other and the engine 50. It is also contemplated that the radiators 40 could be connected to the engine 50 in parallel and with separate pumps so as to operate independently. It is contemplated that one of the two radiators 40 could be used to cool the engine's oil lubricant, while the other is used to cool the engine's coolant liquid.

The left and right radiators 40 are located longitudinally rearward of the axis of rotation 18 (FIG. 1D) of the front wheels 12 and disposed respectively on the left and right sides of the longitudinal centerline 16. The radiators 40 are sufficiently spaced from the fender 32 such that the fenders 32 do not make contact with the radiators 40 when the front wheels 12 are in their maximum turning position. The radiators 40 are forwardly facing and upright, i.e. a normal to the inlet surface of the radiator 40 is parallel to the longitudinal centerline 16 and perpendicular to the vertical axis 17. It is however contemplated that the radiators 40 could be disposed such that the normal to the inlet surface is at an angle to the longitudinal centerline 16 and/or at an angle other than perpendicular to the vertical axis 17 of the vehicle 10. Thus, the radiators 40 could be forwardly or rearwardly inclined; and/or inwardly or outwardly oriented. Numerous orientations, as long as the normal to the inlet surface of a radiator has a longitudinal component, are considered to be well within the scope of the present invention.

As the right and left radiator assemblies are generally mirror images of one another, only the right side radiator assembly will be discussed below. With respect to FIG. 1C, the radiator 40 is respectively disposed within the right cowling 66. An opening 68 is formed in the front portion of the cowling 66 on the right side of the longitudinal centerline. The opening 68 acts as inlet 68 for entry of cool air 78 into the cowling for cooling the radiator 40 and thereby the engine 50. At least a portion of the inlet 68 of the cowling 66 is disposed laterally outwards from the body portions of the front end of the vehicle 1 to ensure air passage to the radiator 40. The cowling 66 is also spaced longitudinally rearwards from the body portions of the front end of the vehicle 1 to create additional air passages to the radiator 40. The radiator 40 is mounted in the cowling 66 behind the inlet 68, however, it is contemplated that the radiator 40 could be disposed within the cowling 66 spaced from the inlet 68.

Figure 3:
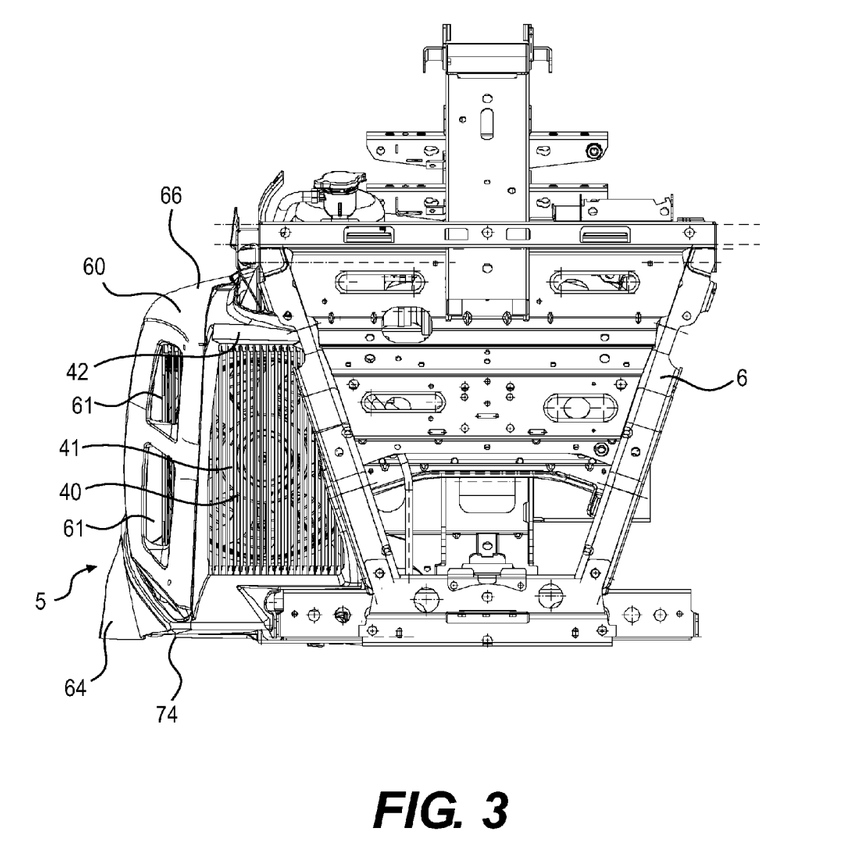
FIG. 3 is a front elevation view of the portion of the vehicle of FIG. 2 showing the vehicle frame and the structure on the right side of the vehicle frame.
Figure 4:
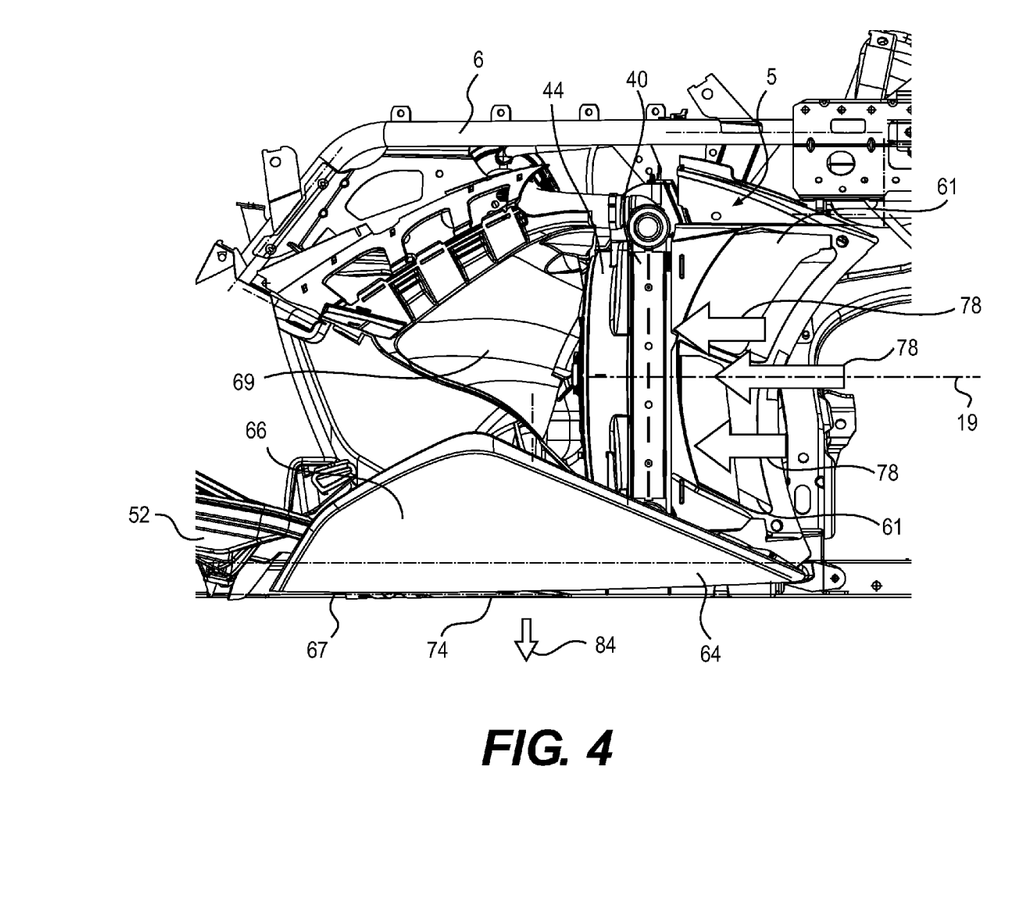
FIG. 4 is a right side elevation view of a portion of the portion of the vehicle of FIG. 2 with one of the right side panels removed to reveal a portion of the structure inside the cowling including a radiator and fan assembly and a right lateral passage.
Figure 5:
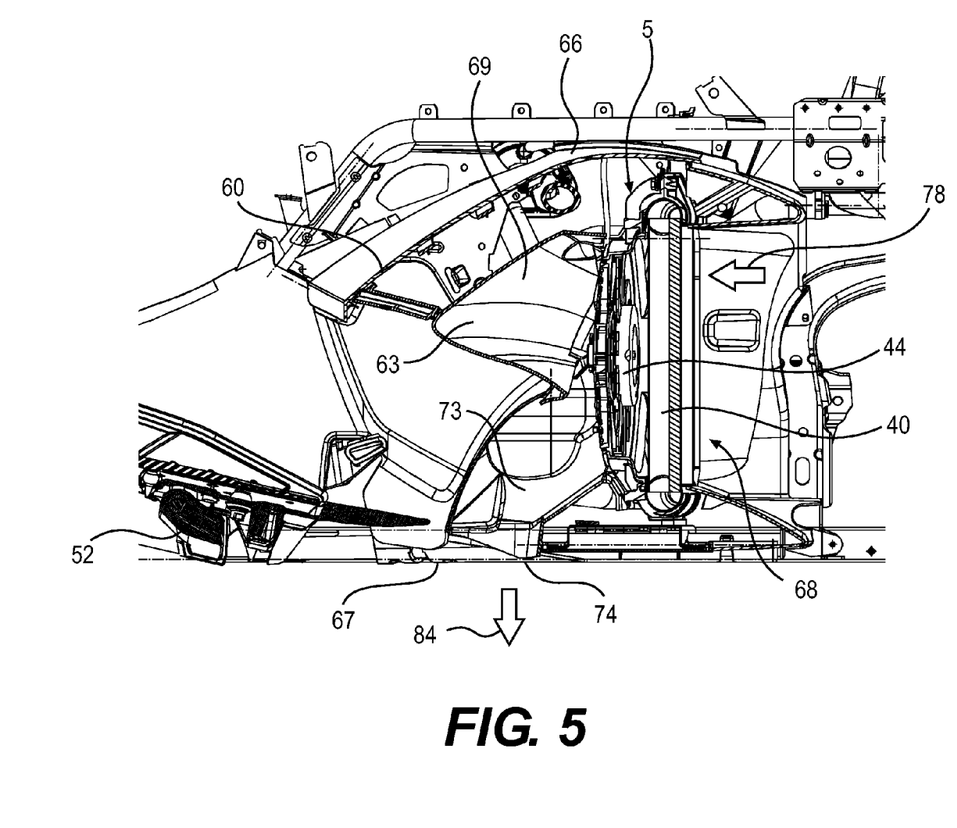
FIG. 5 is a longitudinal cross-section, viewed from the right side, of the portion of the vehicle shown in FIG. 4 with the radiator and fan assembly, a portion of the right lateral passage, and a right downward passage being shown.

Referring to FIGS. 3, 4 and 5, a fan 44 is installed behind the radiator 40 to aid in cooling the engine 50. The fan 44 act as an impeller drawing cool air 78 from outside the cowling 66 through the radiator 40 and rearwardly into the cowling 66. It is contemplated that the fan 44 could serve to direct hot air away from the cowling 66 in a desired direction, for example, by appropriate orientation of the fan 44 and configuration of the fan blades.

The ventilation system 5 of the vehicle 1 comprises the radiator assembly, including the radiators 40 and the fans 44, and the cowlings 66. Turning now to FIGS. 2 to 8, the cowling 66 and the air ventilation system 5 for cooling the radiators 40 in the cowling 66 will now be described. As the right and left sides of the vehicle 1 are generally mirror images of one another for the purposes of a discussion of the ventilation system, only the right side of the vehicle 1 will be discussed below. The components on the left side of the vehicle 1 will be discussed when they differ from those on the right side.

Figure 8:
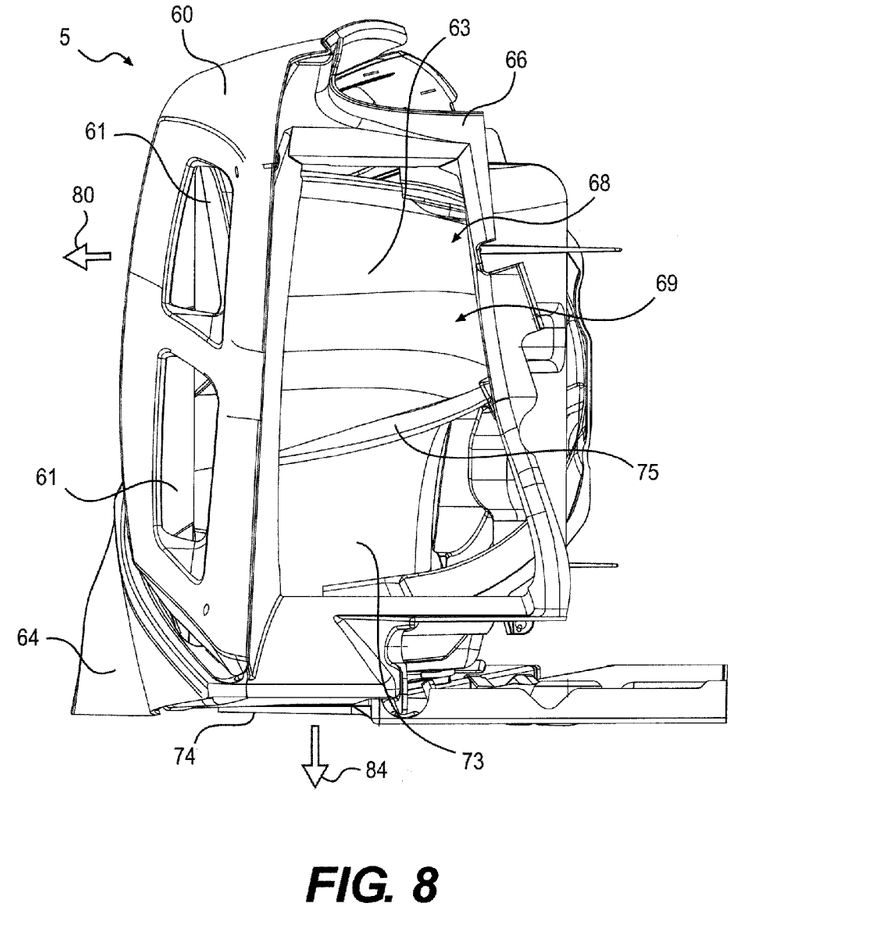
FIG. 8 is a front elevation view of the right side panels and the cowling of the portion of the vehicle of FIG. 2 with the radiator cover, radiator and fan removed to show the interior of the cowling.

As mentioned above, cool air 78 passing into the radiator 40 is heated by absorbing heat from the radiator 40, and the heated air passes rearwards from the radiator 40. As can be seen in FIGS. 2 and 4, the footrest 52 disposed rearward of the radiator 40, would be directly in the line of the heated air flowing rearwards from the radiator 40. The cowling 66 of the vehicle 1 is configured to direct the heated air out of the cowling 66 and away from the riders' feet and other parts of the riders' bodies. As can be seen in FIGS. 2, 3 and 8, additional inlets 61, facing laterally outwards with respect to the longitudinal centerline 16, also direct cool air towards the radiators 40.

Figure 6:
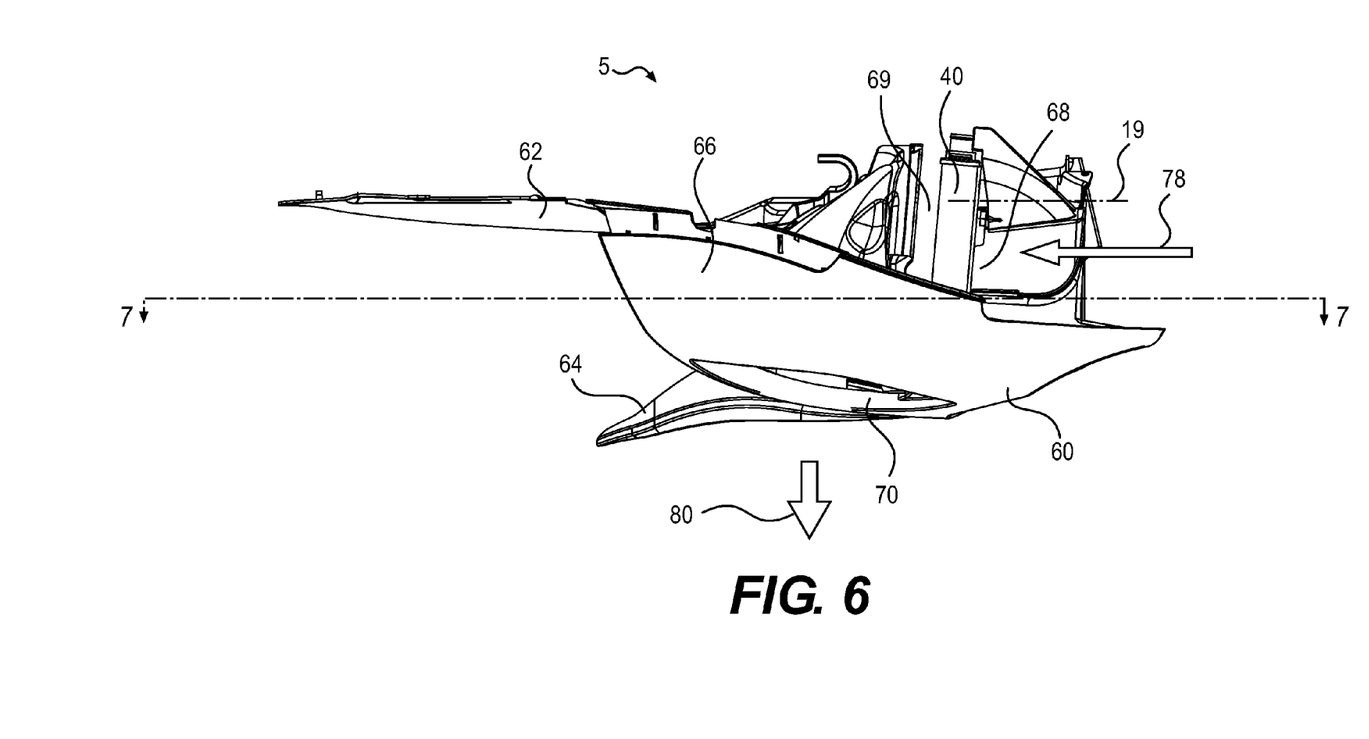
FIG. 6 is a top plan view of the right side panels and the cowling of the portion of the vehicle of FIG. 2 shown with the fan removed for clarity.

With reference to FIGS. 2 and 6, a lateral outlet 70 is formed in side panel 60 of the cowling 66, located longitudinally rearwards of the radiator 40 and aligned with the upper portion of the radiator 40. A portion of the outgoing air 80 flows out of the cowling 66 through the lateral outlet 70. The lateral outlet 70 is generally directed laterally outwards, so that the outgoing air 80 flowing out of the lateral outlet 70 in the side panel 60 is directed laterally outwards and away from the footrest 52. It is contemplated that the lateral outlet 70 could also be directed partially downwards or rearwards so that the outgoing air 80 could be directed out of the cowling 66 partially in a downward or rearward direction. For example, if the lateral outlet 70, or a portion of the lateral outlet 70, is generally disposed at an angle to the vertical axis 17, the outgoing air 80 will flow in directions laterally outwards and upwards or downwards depending on the orientation of the lateral outlet 70 in the side panel 60. It is contemplated that the lateral outlet 70 could be aligned with any other portion of the vertical span of the radiator 40. It is also contemplated that the cowling 66 could have a plurality of lateral outlets 70.

With reference to FIGS. 2, 5, 7 and 8, a portion of the outgoing air 84 flows out of the cowling through a downward outlet 74 in a lower surface 67 of the cowling 66. The downward outlet 74 is defined in part by the lower side panel 64, disposed longitudinally rearward of the radiator 40, and vertically lower than the radiator 40 and the footrest 52. The downward outlet 74 is generally directed vertically downwards. The outgoing air 84 flowing out of the downward outlet 74 in the lower side panel 64 is directed vertically downwards and away from the footrest 52. It is contemplated that the downward outlet 74 could also be directed partially in a laterally outward or rearward direction so that that the outgoing air 84 could be directed out of the cowling 66 partially in a laterally outward or rearward direction. For example, if the downward outlet 74, or a portion of the downward outlet 74, is generally disposed at an angle to the vertical direction, the outgoing air 80 will flow in directions vertically downward and laterally outwards or inwards depending on the orientation of the downward outlet 74. The downward outlet 74 is defined in part by the lower side panel 64, however, it is contemplated that the downward outlet 74 could be entirely defined in a lower panel (not shown) forming a lower surface 67 of the cowling 66. It is also contemplated that a single downward outlet could be defined in the lower surface 67 of the cowling 66 spanning both the left and right sides of the lower surface 67.

Figure 7:
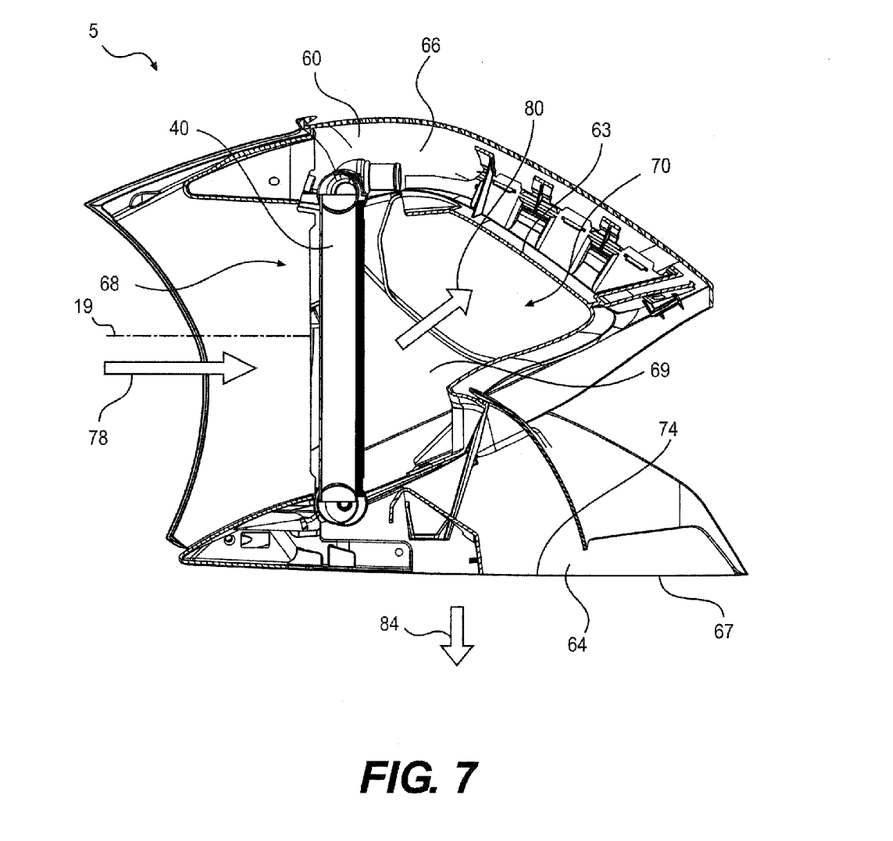
FIG. 7 is a longitudinal cross-section taken along the line 7-7 of FIG. 6, viewed from the left side, of the right side panels and the cowling of the portion of the vehicle of FIG. 2 shown with the fan removed for clarity.

The position of the lateral outlet 70 forward of the footrest 52 and the downward outlet 74 vertically below the footrest 52 ensures that the outgoing air 80 and 84 are directed away from the footrest 52. With reference to FIGS. 7 and 8, the cowling 66 also includes other guiding structures, such as a wall 75 and a passages 73, for channeling air flow through the cowling 66 between the inlet 68 and the outlets 70 and 74.

As can best be seen in FIG. 8, a wall 75 is disposed generally horizontally in the cowling 66 rearward of the radiator 40 and aligned with the middle of the radiator 40. A portion of the incoming air 78 passing through the upper portion of the radiator 40 into the cowling 66 flows along the upper surface of the wall 75 and is directed towards the lateral outlet 70. The portion of the incoming air 78 passing through the lower portion of the radiator 40 into the cowling 66 is directed towards the downward outlet 74 by a wall 71 of the lower portion of the cowling 66. In the upper portion of the cowling 66, a part 63 of the wall 75 curves upwards in the rear portion of the cowling 66 blocking incoming air 78 from flowing towards the footrest 52.

With reference to FIGS. 5, 7 and 8, the cowling 66 has defined therein a downward passage 73 fluidly connecting the lower portion of the cowling 66 with the downward outlet 74. The downward passage 73 further channels the flow of air through the cowling 66 as best seen in FIGS. 7 and 8. It is contemplated that the downward passage 73 could extend continuously from the downward outlet 74 to the radiator 40, or partially therebetween. Similarly it is contemplated that a lateral passage could be provided to extend continuously between the lateral outlet 70 and the radiator, or partially therebetween.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A vehicle, comprising:
   a frame having a front portion and a rear portion;
   a pair of front wheels comprising a left front wheel and a right front wheel, each front wheel being rotatably connected to the front portion of the frame;
   at least one rear wheel rotatably connected to the rear portion of the frame;
   a straddle seat connected to the frame and disposed rearward of the pair of front wheels;
   a pair of footrests comprising a left footrest and a right footrest disposed respectively on a left side and a right side of the seat, the pair of footrests being connected to the frame and being disposed vertically lower than the seat;
   an engine connected to the frame and adapted to propel the vehicle;
   a radiator connected to the frame and to the engine for cooling the engine; and
   a cowling connected to the frame and enclosing at least a portion of the radiator, the cowling including:
      an inlet in fluid communication with at least the portion of the radiator, the inlet adapted to direct air to enter through the portion of the radiator into the cowling;
      a cowling wall disposed between the inlet and one of the pair of footrests, the cowling wall deflecting air entering through the radiator away from the one of the pair of footrests;
      a lateral outlet in fluid communication with the inlet, the lateral outlet being defined on a first side of the cowling rearward of the inlet; and
      a downward outlet in fluid communication with the inlet, the downward outlet being defined on a lower surface of the cowling rearward of the inlet;
      the lateral outlet and the downward outlet, each being adapted to direct air exiting the cowling away from the one of the pair of footrests.

2. The vehicle of claim 1, wherein the lateral outlet is adapted to direct a portion of the air exiting the cowling in a laterally outward direction.

3. The vehicle of claim 1, wherein the downward outlet is adapted to direct a portion of the air exiting the cowling in a downward direction.

4. The vehicle of claim 1, wherein the cowling further includes at least one lateral passage fluidly communicating the inlet with the lateral outlet.

5. The vehicle of claim 1, wherein the cowling further includes at least one downward passage fluidly communicating the inlet with the downward outlet.

6. The vehicle of claim 1, wherein the cowling encloses the radiator.

7. The vehicle of claim 1, further comprising at least one fan adapted to draw air into the cowling through the inlet and through the radiator.

8. The vehicle of claim 7, wherein the at least one fan is disposed rearward of the radiator.

9. The vehicle of claim 1, wherein the inlet is disposed laterally between a longitudinal centerline of the frame and one of the pair of front wheels.

10. The vehicle of claim 1, wherein the inlet is disposed rearward of the pair of front wheels.

11. The vehicle of claim 1, wherein the inlet is generally oriented forwardly.

12. The vehicle of claim 1, wherein the one of the pair of footrests is disposed rearward of the lateral and downward outlets.

13. The vehicle of claim 1, wherein the one of the pair of footrests is disposed vertically above the downward outlet.

14. The vehicle of claim 1, wherein the pair of footrests is a pair of footpegs.

15. The vehicle of claim 1, wherein the pair of footrests is a pair of footboards.

16. The vehicle of claim 1, wherein
   the cowling is a left cowling;
   the radiator is a left radiator;
   the inlet is a left inlet;
   the one of the pair of footrests is a left footrest;

the first side of the cowling is a left side of the cowling;
the lateral outlet is a left lateral outlet;
the downward outlet is a left downward outlet;
the vehicle further comprising:
- a right radiator connected to the frame and to the engine for cooling the engine; and
- a right cowling connected to the frame and enclosing at least a portion of the right radiator, the right cowling including:
  - a right inlet fluidly communicating at least the portion of the right radiator, the right inlet adapted to direct air to enter through the portion of the right radiator into the right cowling;
  - a right cowling wall disposed forward of the right footrest, the cowling wall deflecting air entering through the portion of the right radiator into the right cowling away from the right footrest;
  - a right lateral outlet in fluid communication with the right inlet, the right lateral outlet being defined on a right side of the cowling rearward of the right inlet; and
  - a right downward outlet in fluid communication with the right inlet, the right downward outlet being defined on a lower surface of the right cowling rearward of the right inlet;
  - the right lateral outlet and the right downward outlet, each being adapted to direct air exiting the cowling away from the right footrest.

\* \* \* \* \*